(12) United States Patent
Stell et al.

(10) Patent No.: US 7,767,170 B2
(45) Date of Patent: Aug. 3, 2010

(54) CRACKING HYDROCARBON FEEDSTOCK CONTAINING RESID UTILIZING PARTIAL CONDENSATION OF VAPOR PHASE FROM VAPOR/LIQUID SEPARATION TO MITIGATE FOULING IN A FLASH/SEPARATION VESSEL

(75) Inventors: Richard C. Stell, Houston, TX (US); George Stephens, Humble, TX (US); Jennifer L. Bancroft, Houston, TX (US); John R. Messinger, Kingwood, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 954 days.

(21) Appl. No.: 11/454,779

(22) Filed: Jun. 16, 2006

(65) Prior Publication Data

US 2007/0049783 A1  Mar. 1, 2007

Related U.S. Application Data

(62) Division of application No. 10/851,494, filed on May 21, 2004, now Pat. No. 7,247,765.

(51) Int. Cl.
| | |
|---|---|
| *B01J 19/00* | (2006.01) |
| *B01J 10/00* | (2006.01) |
| *F28D 7/00* | (2006.01) |
| *F28D 21/00* | (2006.01) |
| *B01D 3/42* | (2006.01) |

(52) U.S. Cl. .............. 422/198; 422/188; 422/189; 422/193; 422/194; 422/208; 422/200; 196/139; 196/98; 196/99; 196/100; 196/102; 203/2; 203/6; 203/11; 203/20; 203/40; 585/647; 585/648; 585/652; 208/130

(58) Field of Classification Search ............ 422/188, 422/189, 193, 194, 198, 200, 223, 224, 208; 208/130, 347–369; 585/648, 647, 652; 196/98, 196/99, 100, 102, 139; 203/2, 6, 11, 20, 203/40, 80, 88
See application file for complete search history.

(56) References Cited

U.S. PATENT DOCUMENTS 1,936,699 A  11/1933  Weaver
(Continued)

FOREIGN PATENT DOCUMENTS

DE  10 93 351  11/1960
(Continued)

OTHER PUBLICATIONS

"Specialty Furnace Design: Steam Reformers and Steam Crackers", presented by T.A. Wells of the M.W. Kellogg Company, 1988 AIChE Spring National Meeting.
(Continued)

*Primary Examiner*—Walter D Griffin
*Assistant Examiner*—Huy-Tram Nguyen (57) ABSTRACT

A process is provided for cracking hydrocarbon feedstock containing resid comprising: heating the feedstock, mixing the heated feedstock with a fluid and/or a primary dilution steam stream to form a mixture, optionally further heating the mixture, flashing the mixture within a flash/separation vessel to form a vapor phase and a liquid phase, partially condensing the vapor phase by contacting with a condenser within the vessel, to condense at least some coke precursors within the vapor while providing condensates which add to the liquid phase, removing the vapor phase of reduced coke precursors content as overhead and the liquid phase as bottoms, heating the vapor phase, cracking the vapor phase in a radiant section of a pyrolysis furnace to produce an effluent comprising olefins, and quenching the effluent and recovering cracked product therefrom. An apparatus for carrying out the process is also provided.

21 Claims, 3 Drawing Sheets

U.S. PATENT DOCUMENTS

| | | | |
|---|---|---|---|
| 1,984,569 A | 12/1934 | Cooke et al. | 196/66 |
| 2,091,261 A | 8/1937 | Alther | 196/49 |
| 2,158,425 A | 5/1939 | Ragatz | 196/73 |
| 3,291,573 A | 12/1966 | Frescoln | |
| 3,341,429 A | 9/1967 | Fondrk | |
| 3,413,211 A | 11/1968 | Becraft et al. | 208/93 |
| 3,420,069 A | 1/1969 | Booth | |
| 3,487,006 A | 12/1969 | Newman et al. | 208/93 |
| 3,492,795 A | 2/1970 | Guerrieri | |
| 3,505,210 A | 4/1970 | Wallace et al. | |
| 3,617,493 A | 11/1971 | Wirth et al. | 208/80 |
| 3,677,234 A | 7/1972 | Dutkiewicz | |
| 3,718,709 A | 2/1973 | Simonetta | 260/683 R |
| 3,900,300 A | 8/1975 | Lehman | |
| 4,199,409 A | 4/1980 | Skraba | |
| 4,264,432 A | 4/1981 | Gartside | 208/48 R |
| 4,300,998 A | 11/1981 | Gartside | 208/127 |
| 4,311,580 A | 1/1982 | Bartholic | 208/91 |
| 4,361,478 A | 11/1982 | Gengler et al. | |
| 4,390,398 A * | 6/1983 | Coker et al. | 203/18 |
| 4,400,182 A | 8/1983 | Davies et al. | |
| 4,426,278 A | 1/1984 | Kosters | 208/130 |
| 4,444,571 A | 4/1984 | Matson | |
| 4,483,697 A | 11/1984 | Deysson et al. | |
| 4,495,035 A * | 1/1985 | Swearingen | 203/23 |
| 4,543,177 A | 9/1985 | Murthy et al. | 208/130 |
| 4,575,403 A * | 3/1986 | Rosenhouse et al. | 202/153 |
| 4,615,795 A | 10/1986 | Woebcke et al. | 208/72 |
| 4,683,025 A * | 7/1987 | Flores | 159/2.1 |
| 4,714,109 A | 12/1987 | Tsao | |
| 4,732,740 A | 3/1988 | Woebcke et al. | 422/193 |
| 4,840,725 A | 6/1989 | Paspek | 208/130 |
| 4,854,944 A | 8/1989 | Strong | 48/214 R |
| 4,954,247 A | 9/1990 | Lipkin et al. | |
| 5,096,567 A | 3/1992 | Paspek, Jr. et al. | 208/106 |
| 5,120,892 A | 6/1992 | Skraba | 585/652 |
| 5,190,634 A | 3/1993 | Fernandez-Baujin et al. | 208/107 |
| 5,398,515 A * | 3/1995 | Lak | 62/47.1 |
| 5,415,732 A * | 5/1995 | Catelli | 159/47.1 |
| 5,468,367 A | 11/1995 | Dickakian et al. | |
| 5,580,443 A | 12/1996 | Yoshida et al. | 208/130 |
| 5,817,226 A | 10/1998 | Lenglet | |
| 5,910,440 A | 6/1999 | Grossman et al. | |
| 6,093,310 A | 7/2000 | Swan | |
| 6,123,830 A | 9/2000 | Gupta et al. | |
| 6,179,997 B1 | 1/2001 | Vedder, Jr. et al. | 208/113 |
| 6,190,533 B1 | 2/2001 | Bradow et al. | |
| 6,210,351 B1 | 4/2001 | Bradow et al. | |
| 6,210,561 B1 | 4/2001 | Bradow et al. | 208/89 |
| 6,254,734 B1 * | 7/2001 | Sephton | 203/2 |
| 6,303,842 B1 | 10/2001 | Bridges et al. | |
| 6,353,088 B1 * | 3/2002 | Fujitaka et al. | 528/501 |
| 6,376,732 B1 | 4/2002 | Ngan et al. | |
| 6,413,414 B1 * | 7/2002 | Arnold et al. | 208/308 |
| 6,632,351 B1 | 10/2003 | Ngan et al. | 208/132 |
| RE38,366 E * | 12/2003 | Kenton | 208/184 |
| 6,743,961 B2 | 6/2004 | Powers | |
| 7,118,724 B2 | 10/2006 | Kim et al. | |
| 7,235,705 B2 | 6/2007 | Stell | |
| 2001/0016673 A1 | 8/2001 | Bridges et al. | |
| 2003/0070963 A1 | 4/2003 | Zimmermann et al. | |
| 2004/0004022 A1 | 1/2004 | Stell et al. | 208/106 |
| 2004/0004027 A1 | 1/2004 | Spicer et al. | 208/130 |
| 2004/0004028 A1 | 1/2004 | Stell et al. | 208/130 |
| 2004/0039240 A1 | 2/2004 | Powers | |
| 2004/0054247 A1 | 3/2004 | Powers | |
| 2005/0010075 A1 | 1/2005 | Powers | |
| 2005/0209495 A1 | 9/2005 | McCoy et al. | |

FOREIGN PATENT DOCUMENTS

| | | |
|---|---|---|
| EP | 0063448 | 10/1982 |
| FR | 1472280 | 3/1967 |
| GB | 199766 | 6/1923 |
| GB | 998504 | 7/1965 |
| GB | 1053751 | 1/1967 |
| GB | 1203017 | 8/1970 |
| GB | 1233795 | 5/1971 |
| GB | 2 006 259 | 10/1977 |
| GB | 2 012 176 | 11/1977 |
| NL | 7410163 | 4/1975 |
| SU | 1491552 | 7/1989 |
| WO | WO 01/55280 | 8/2001 |
| WO | WO 2004/005433 | 1/2004 |
| ZA | 907394 | 7/1991 |

OTHER PUBLICATIONS

Dennis A. Duncan and Vance A. Ham, Stone & Webster, "The Practicalities of Steam-Cracking Heavy Oil", Mar. 29-Apr. 2, 1992, AIChE Spring National Meeting in New Orleans, LA, pp. 1-41.

ABB Lummus Crest Inc., (presentation) HOPS, "Heavy Oil Processing System", Jun. 15, 1992 TCC PEW Meeting, pp. 1-18.

Mitsui Sckka Engineering Co., Ltd./Mitsui Engineering & Shipbuilding Co., Ltd., "Mitsui Advanced Cracker & Mitsui Innovative Quencher", pp. 1-16.

* cited by examiner

CRACKING HYDROCARBON FEEDSTOCK CONTAINING RESID UTILIZING PARTIAL CONDENSATION OF VAPOR PHASE FROM VAPOR/LIQUID SEPARATION TO MITIGATE FOULING IN A FLASH/SEPARATION VESSEL

This application is a divisional of U.S. patent application Ser. No. 10/851,494, filed May 21, 2004 now U.S. Pat. No. 7,247,765, and is fully incorporated herein by reference.

FIELD OF THE INVENTION

The present invention relates to the cracking of hydrocarbons that contain relatively non-volatile hydrocarbons, e.g., resids, and other contaminants. More particularly, the present invention relates to the reduction of fouling during operation caused by coke precursors present in vapor phase overheads.

BACKGROUND

Steam cracking, also referred to as pyrolysis, has long been used to crack various hydrocarbon feedstocks into olefins, preferably light olefins such as ethylene, propylene, and butenes. Conventional steam cracking utilizes a pyrolysis furnace which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock and steam mixture is then introduced into the radiant section where the cracking takes place. The resulting products, including olefins, leave the pyrolysis furnace for further downstream processing, including quenching.

Pyrolysis involves heating the feedstock sufficiently to cause thermal decomposition of the larger molecules. The pyrolysis process, however, produces molecules which tend to combine to form high molecular weight materials known as tar. Tar is a high-boiling point, viscous, reactive material that can foul equipment under certain conditions. In general, feedstocks containing higher boiling materials tend to produce greater quantities of tar.

The formation of tar after the pyrolysis effluent leaves the steam cracking furnace can be minimized by rapidly reducing the temperature of the effluent exiting the pyrolysis unit to a level at which the tar-forming reactions are greatly slowed. This cooling, which may be achieved in one or more steps and using one or more methods, is referred to as quenching.

Conventional steam cracking systems have been effective for cracking high-quality feedstock which contains a large fraction of light volatile hydrocarbons, such as gas oil and naphtha. However, steam cracking economics sometimes favor cracking lower cost feedstocks containing resids such as, by way of non-limiting examples, atmospheric residue (e.g. atmospheric pipestill bottoms) and crude oil. Crude oil and atmospheric residue often contain high molecular weight, non-volatile components with boiling points in excess of 590° C. (1100° F.). The non-volatile, components of these feedstocks lay down as coke in the convection section of conventional pyrolysis furnaces. Only very low levels of non-volatile components can be tolerated in the convection section downstream of the point where the lighter components have fully vaporized.

Cracking heavier feeds, such as kerosenes and gas oils, produces large amounts of tar, which leads to rapid coking in

2 the radiant section of the furnace as well as fouling in the transfer line exchangers preferred in lighter liquid cracking service.

Additionally, during transport, some naphthas are contaminated with heavy crude oil containing non-volatile components. Conventional pyrolysis furnaces do not have the flexibility to process residues, crudes, or many residue or crude contaminated gas oils or naphthas which are contaminated with non-volatile components.

To address coking problems, U.S. Pat. No. 3,617,493, which is incorporated herein by reference, discloses the use of an external vaporization drum for the crude oil feed and discloses the use of a first flash to remove naphtha as vapor and a second flash to remove vapors with a boiling point between 450 and 1100° F. (230 and 590° C.). The vapors are cracked in the pyrolysis furnace into olefins, and the separated liquids from the two flash tanks are removed, stripped with steam, and used as fuel.

U.S. Pat. No. 3,718,709, which is incorporated herein by reference, discloses a process to minimize coke deposition. It describes preheating of heavy feedstock inside or outside a pyrolysis furnace to vaporize about 50% of the heavy feedstock with superheated steam and the removal of the residual, separated liquid. The vaporized hydrocarbons, which contain mostly light volatile hydrocarbons, are subjected to cracking.

U.S. Pat. No. 5,190,634, which is incorporated herein by reference, discloses a process for inhibiting coke formation in a furnace by preheating the feedstock in the presence of a small, critical amount of hydrogen in the convection section. The presence of hydrogen in the convection section inhibits the polymerization reaction of the hydrocarbons thereby inhibiting coke formation.

U.S. Pat. No. 5,580,443, which is incorporated herein by reference, discloses a process wherein the feedstock is first preheated and then withdrawn from a preheater in the convection section of the pyrolysis furnace. This preheated feedstock is then mixed with a predetermined amount of steam (the dilution steam) and is then introduced into a gas-liquid separator to separate and remove a required proportion of the non-volatiles as liquid from the separator. The separated vapor from the gas-liquid separator is returned to the pyrolysis furnace for heating and cracking.

Co-pending U.S. application Ser. No. 10/188,461 filed Jul. 3, 2002, Patent Application Publication US 2004/0004022 A1, published Jan. 8, 2004, which is incorporated herein by reference, describes an advantageously controlled process to optimize the cracking of volatile hydrocarbons contained in the heavy hydrocarbon feedstocks and to reduce and avoid coking problems. It provides a method to maintain a relatively constant ratio of vapor to liquid leaving the flash by maintaining a relatively constant temperature of the stream entering the flash. More specifically, the constant temperature of the flash stream is maintained by automatically adjusting the amount of a fluid stream mixed with the heavy hydrocarbon feedstock prior to the flash. The fluid can be water.

Co-pending U.S. Patent Application Ser. No. 60/555,282, filed Mar. 22, 2004, which is incorporated herein by reference, describes a process for cracking heavy hydrocarbon feedstock which mixes heavy hydrocarbon feedstock with a fluid, e.g., hydrocarbon or water, to form a mixture stream which is flashed to form a vapor phase and a liquid phase, the vapor phase being subsequently cracked to provide olefins, with product effluent cooled in a transfer line exchanger, wherein the amount of fluid mixed with the feedstock is varied in accordance with a selected operating parameter of the process, e.g., temperature of the mixture stream before the mixture stream is flashed.

Co-pending U.S. patent application Ser. No. 11/454,338, filed herewith, describes a process for cracking heavy hydrocarbon feedstock which mixes heavy hydrocarbon feedstock with a fluid, e.g., hydrocarbon or water, to form a mixture stream which is flashed to form a vapor phase and a liquid phase, the vapor phase being subsequently cracked to provide olefins. Fouling downstream of the flash/separation vessel is reduced by superheating the vapor in the upper portion of the vessel. A condenser may also be utilized within the vessel to improve liquid/vapor separation.

In using a flash to separate heavy liquid hydrocarbon fractions containing resid from the lighter fractions which can be processed in the pyrolysis furnace, it is important to effect the separation so that most of the non-volatile components will be in the liquid phase. Otherwise, heavy, coke-forming non-volatile components in the vapor are carried into the furnace causing coking problems.

Increasing the cut in the flash drum, or the fraction of the hydrocarbon that vaporizes, is also extremely desirable because resid-containing liquid hydrocarbon fractions generally have a low value, often less than heavy fuel oil. Vaporizing some of the heavier fractions produces more valuable steam cracker feed. Although this can be accomplished by increasing the flash drum temperature to increase the cut, the resulting heavier fractions thus vaporized tend to condense once the overhead vapor phase leaves the flash drum, resulting in fouling of the lines and vessels downstream of the flash drum overhead outlet.

Accordingly, it would be desirable to provide a process for treating vapor phase materials within a flash drum to remove components which are susceptible to condensing downstream of the drum overheads outlet.

SUMMARY

In one aspect, the present invention relates to a process for cracking a hydrocarbon feedstock containing resid. The process comprises: (a) heating the hydrocarbon feedstock; (b) mixing the heated hydrocarbon feedstock with steam to form a mixture stream; (c) introducing the mixture stream in a flash/separation vessel through an inlet to form i) a vapor phase at its dew point which contains a lesser portion of coke precursors and ii) a liquid phase which contains a greater portion of coke precursors; (d) partially condensing the vapor phase within the flash/separation vessel by contacting the vapor phase with a condenser, which condenses at least some of the lesser portion of coke precursors, which adds to the liquid phase, the condensing providing a vapor phase above the condenser of reduced coke precursors content; (e) removing the vapor phase of reduced coke precursors content as overhead through an overhead outlet, and the liquid phase as bottoms, from the flash/separation vessel; (f) heating the vapor phase; (g) cracking the heated vapor phase in a radiant section of a pyrolysis furnace to produce an effluent comprising olefins, the pyrolysis furnace comprising a radiant section and a convection section; and (h) quenching the effluent and recovering cracked product therefrom. In one embodiment, the mixture stream is heated prior to introduction to the flash/separation vessel.

In another aspect, the present invention relates to a flash/separation vessel for treating hydrocarbon feedstock containing resid to provide a liquid phase and a vapor phase, which comprises: (A) an inlet for introducing to the vessel under flashing conditions a mixture stream comprising the hydrocarbon feedstock and steam where the mixture stream undergoes an initial flashing to form i) a vapor phase at its dew point which contains a lesser portion of coke precursors; and ii) a liquid phase which contains a greater portion of coke precursors; (B) a partial condenser for contacting the vapor phase within the flash/separation vessel and at least partially condensing at least some of the lesser portion of coke precursors, which adds to the liquid phase, the condensing providing a vapor phase of reduced coke precursor content; (C) a flash/separation vessel overhead outlet for removing the vapor phase of reduced coke precursors content as overhead; and (D) a flash/separation vessel liquid outlet for removing the liquid phase as bottoms from the flash/separation vessel.

In still another aspect, the present invention relates to an apparatus for cracking a hydrocarbon feedstock containing resid, the apparatus comprising: (a) a heating zone for heating the hydrocarbon feedstock to provide heated hydrocarbon feedstock; (b) a mixing zone for mixing a primary dilution steam stream with the heated hydrocarbon feedstock to provide a heated two-phase stratified open channel flow mixture stream; (c) a vapor/liquid separation zone for treating vapor/liquid mixtures of hydrocarbons and steam, the separation zone comprising: (i) a substantially cylindrical vertical drum having an upper cap section, a middle section comprising a circular wall, and a lower cap section; (ii) an overhead vapor outlet attached to the upper cap section; (iii) at least one substantially tangentially positioned inlet in the wall of the middle section for introducing the flow mixture stream along the wall under flashing conditions where the flow mixture stream undergoes an initial flashing to form A) a vapor phase at its dew point which contains a lesser portion of coke precursors, and B) a liquid phase which contains a greater portion of coke precursors; (iv) a partial condenser for contacting the vapor phase within the drum for at least partially condensing at least some of the lesser portion of coke precursors, which adds to the liquid phase, the condensing providing a vapor phase of reduced coke precursors content; (v) a drum overhead outlet for removing the vapor phase of reduced precursors content as overhead; (vi) a drum liquid outlet for removing the liquid phase as bottoms from the drum; and (vii) a substantially concentrically positioned, substantially cylindrical boot of less diameter than the middle section, the boot communicating with the lower cap section, and further comprising an inlet for quench oil, e.g., recycle quench oil, and a liquid outlet at its lower end; (d) a pyrolysis furnace comprising a convection section, and a radiant section for cracking the vapor phase from the overhead vapor outlet to produce an effluent comprising olefins; (e) a means for quenching the effluent; and (f) a recovery train for recovering cracked product from the quenched effluent. In one embodiment, the apparatus further comprises a heating zone for heating the mixture stream upstream of the flash/separation zone.

DETAILED DESCRIPTION

The present invention relates to a process for cracking hydrocarbon feedstock containing resid comprising heating the feedstock, mixing the heated feedstock with a fluid and/or a primary dilution steam stream to form a mixture stream, and flashing the mixture stream within a flash/separation vessel to form a vapor phase and a liquid phase. The vapor phase is partially condensed by contacting with a condenser and, optionally, surfaces (sheds) underneath the condenser to improve contact between the condensate and the rising vapor, within the vessel, to condense at least some coke precursors within the vapor while providing condensates which add to the liquid phase. The vapor phase of reduced coke precursors content is removed as overhead and the liquid phase is removed as bottoms. The vapor phase is heated and then cracked in a radiant section of a pyrolysis furnace to produce an effluent comprising olefins. The resulting effluent is quenched and cracked product is recovered from the quenched effluent.

The condenser is advantageously located within the flash/separation vessel, typically above the inlet of the flash/separation vessel which introduces the hydrocarbonaceous feed to the vessel. The condenser comprises a vapor/liquid contacting surface which is maintained under conditions sufficient to effect condensation of condensable fractions within the vapor phase. In one embodiment, the condenser comprises a heat-conducting tube containing a cooling medium. The tube can be made of any heat conducting material, e.g., metal, which complies with local boiler and piping codes. A cooling medium is present within the tube, e.g., a fluid such as a liquid or gas. In one embodiment, the cooling medium comprises liquid, typically, water, e.g., boiler feed water. The tube typically comprises a tube inlet and a tube outlet for introducing and removing the cooling medium. At least one of the tube inlet and the tube outlet can pass through a wall of the flash/separation vessel, or, alternatively, at least one of the tube inlet and the tube outlet pass through the overhead outlet of the flash/separation vessel.

In operation, the condenser tube typically has an outside tube metal temperature (TMT) ranging from about 200 to about 370° C. (400 to 700° F.), say, from about 260 to about 315° C. (500 to 600° F.). At this temperature, a large amount of hydrocarbon condensation occurs on the outside of the cooling tubes but not in the drum cross-sectional area between the tubes, producing a partial condenser effect. The tube may be of any size sufficient to impart the requisite heat to the vapor phase. Typically, the tube has a diameter of about 10 cm (4 in). For a vessel of about 4 m (13 feet) diameter, the condenser heat duty typically ranges from about 0.06 to about 0.60 MW (0.2 to 2 MBtu/hr), say, from about 0.1 to about 0.3 MW (0.4 to 1 MBtu/hr). In one embodiment, boiler feed water is passed through the condenser at a rate of about 450 to about 13000 kg/hr (1 to 30 klb/hr) at a temperature ranging from about 100 to about 260° C. (212 to 500° F.), at a pressure ranging from about 350 to about 17,000 kPag (50 to 2500 psig).

It is desirable that the condenser fit within the upper portion of the flash/separation vessel; thus the condenser is typically substantially planar and configured so it can be horizontally mounted within the vessel. In one embodiment, the tube present in the condenser is continuous and comprised of alternating straight sections and 180° bend sections beginning with a straight inlet section and terminating in a straight outlet section. Cooling medium which is cooler than the vapor phase temperature is introduced via the inlet section and, after heat exchange with the vapor, heated cooling medium is withdrawn through the outlet section.

In another embodiment, the condenser comprises a substantially straight inlet communicating with an inlet manifold substantially perpendicular to the straight inlet, at least two substantially parallel cooling tubes substantially perpendicular to and communicating with the inlet manifold and substantially perpendicular to and communicating with an outlet manifold, and a substantially straight outlet perpendicular to and communicating with the outlet manifold.

In one embodiment, the surface area of the tube is enhanced by providing extended surfaces along the tube, e.g., by attaching fins to the tube along its length. Typically, the tube comprises at least about 2 fin/cm of tube length (5 fins/inch of tube length) and the fins range from about ⅝ to about 2½ cm (¼ to 1 in) in height, and about 0.05 to about 0.4 cm (0.02 to 0.15 in) in thickness, say, about 2 cm (¾ in) in height, and about ⅛ cm (0.05 in) in thickness.

In still another embodiment, the tube employed in the condenser comprises a substantially concentrically placed inner tube within an outer tube, wherein cooling liquid, e.g., water is passed through the inner tube while steam is passed through the outer tube. Typically, the inner tube has a diameter ranging from about 2½ to about 10 cm (1 to 4 in) and the outer tube has a diameter ranging from about 5 to about 15 cm (2 to 6 in), say, the inner tube has a diameter of about 5 cm (2 in) and the outer tube has a diameter of about 10 cm (4 in).

In yet another embodiment, a set of passive liquid/vapor contacting surfaces is positioned beneath the condenser, within the flash/separation vessel. Typically, a set of liquid/vapor contacting surface(s) is provided by a first row of sheds arranged substantially perpendicularly to the tube. The sheds have an inverted V cross-section which serves to drain liquid formed from the surface downward off the sheds for contacting with the vapor phase or for collection as bottoms. The set of liquid/vapor contacting surfaces can further comprise at least one additional row of sheds positioned substantially parallel to and beneath the first row of sheds. Other suitable liquid/vapor contacting surfaces include Glitsch Grid and other distillation tower wide open packing.

In still another embodiment, a second condenser is located beneath the liquid/vapor contacting surfaces to enhance condensation of the vapor phase.

The mixture stream is typically introduced to the flash/separation vessel through an inlet in the side of the flash/separation vessel. The inlet can be substantially perpendicular to the vessel wall, or more advantageously, angled so as to be at least partially tangential to the vessel wall in order to effect swirling of the mixture stream feed within the vessel.

The process of the present invention is typically operated so that the condensing step provides a vapor phase reduced in coke precursor content by at least about 50%, say at least about 80%, relative to a comparable vapor phase produced in the absence of the condensing.

Quenching the effluent leaving the pyrolysis furnace may be carried out using a transfer line exchanger, wherein the amount of the fluid mixed with the hydrocarbon feedstock is varied in accordance with at least one selected operating parameter of the process. The fluid can be a hydrocarbon or water, preferably water.

In applying this invention, the hydrocarbon feedstock containing resid and coke precursors may be heated by indirect contact with flue gas in a first convection section tube bank of the pyrolysis furnace before mixing with the fluid. Preferably, the temperature of the hydrocarbon feedstock is from about 150° C. to about 260° C. (300° F. to 500° F.) before mixing with the fluid.

The mixture stream may then be heated by indirect contact with flue gas in a first convection section of the pyrolysis furnace before being flashed. Preferably, the first convection section is arranged to add the fluid, and optionally, primary dilution steam, between passes of that section such that the hydrocarbon feedstock can be heated before mixing with the fluid and the mixture stream can be further heated before being flashed.

The temperature of the flue gas entering the first convection section tube bank is generally less than about 815° C. (1500° F.), for example less than about 700° C. (1300° F.), such as less than about 620° C. (1150° F.), and preferably less than about 540° C. (1000° F.).

Dilution steam may be added at any point in the process, for example, it may be added to the hydrocarbon feedstock containing resid before or after heating, to the mixture stream, and/or to the vapor phase. Any dilution steam stream may comprise sour or process steam. Any dilution steam stream may be heated or superheated in a convection section tube bank located anywhere within the convection section of the furnace, preferably in the first or second tube bank.

The mixture stream may be at about 315 to about 540° C. (600° F. to 1000° F.) before the flash in step (c), and the flash pressure may be about 275 to about 1375 kPa (40 to 200 psia). Following the flash, 50 to 98% of the mixture stream may be in the vapor phase. An additional separator such as a centrifugal separator may be used to remove trace amounts of liquid from the vapor phase. The vapor phase may be heated above the flash temperature before entering the radiant section of the furnace, for example, from about 425 to about 705° C. (800 to 1300° F.). This heating may occur in a convection section tube bank, preferably the tube bank nearest the radiant section of the furnace.

Unless otherwise stated, all percentages, parts, ratios, etc. are by weight. Unless otherwise stated, a reference to a compound or component includes the compound or component by itself, as well as in combination with other compounds or components, such as mixtures of compounds.

Further, when an amount, concentration, or other value or parameter is given as a list of upper preferable values and lower preferable values, this is to be understood as specifically disclosing all ranges formed from any pair of an upper preferred value and a lower preferred value, regardless whether ranges are separately disclosed.

As used herein, non-volatile components, or resids, are the fraction of the hydrocarbon feed with a nominal boiling point above about 590° C. (1100° F.) as measured by ASTM D-6352-98 or D-2887. This invention works very well with non-volatiles having a nominal boiling point above about 760° C. (1400° F.). The boiling point distribution of the hydrocarbon feed is measured by Gas Chromatograph Distillation (GCD) by ASTM D-6352-98 or D-2887 extended by extrapolation for materials boiling above 700° C. (1292° F.). Non-volatiles include coke precursors, which are large, condensable molecules that condense in the vapor, and then form coke under the operating conditions encountered in the present process of the invention.

The hydrocarbon feedstock can comprise a large portion, such as about 2 to about 50%, of non-volatile components. Such feedstock could comprise, by way of non-limiting examples, one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, hydrocarbon gases/residue admixtures, hydrogen/residue admixtures, C4's/residue admixture, naphtha/residue admixture, gas oil/residue admixture, and crude oil.

The hydrocarbon feedstock can have a nominal end boiling point of at least about 315° C. (600° F.), generally greater than about 510° C. (950° F.), typically greater than about 590° C. (1100° F.), for example, greater than about 760° C. (1400° F.). The economically preferred feedstocks are generally low sulfur waxy residues, atmospheric residues, naphthas contaminated with crude, various residue admixtures, and crude oils.

Figure 1:
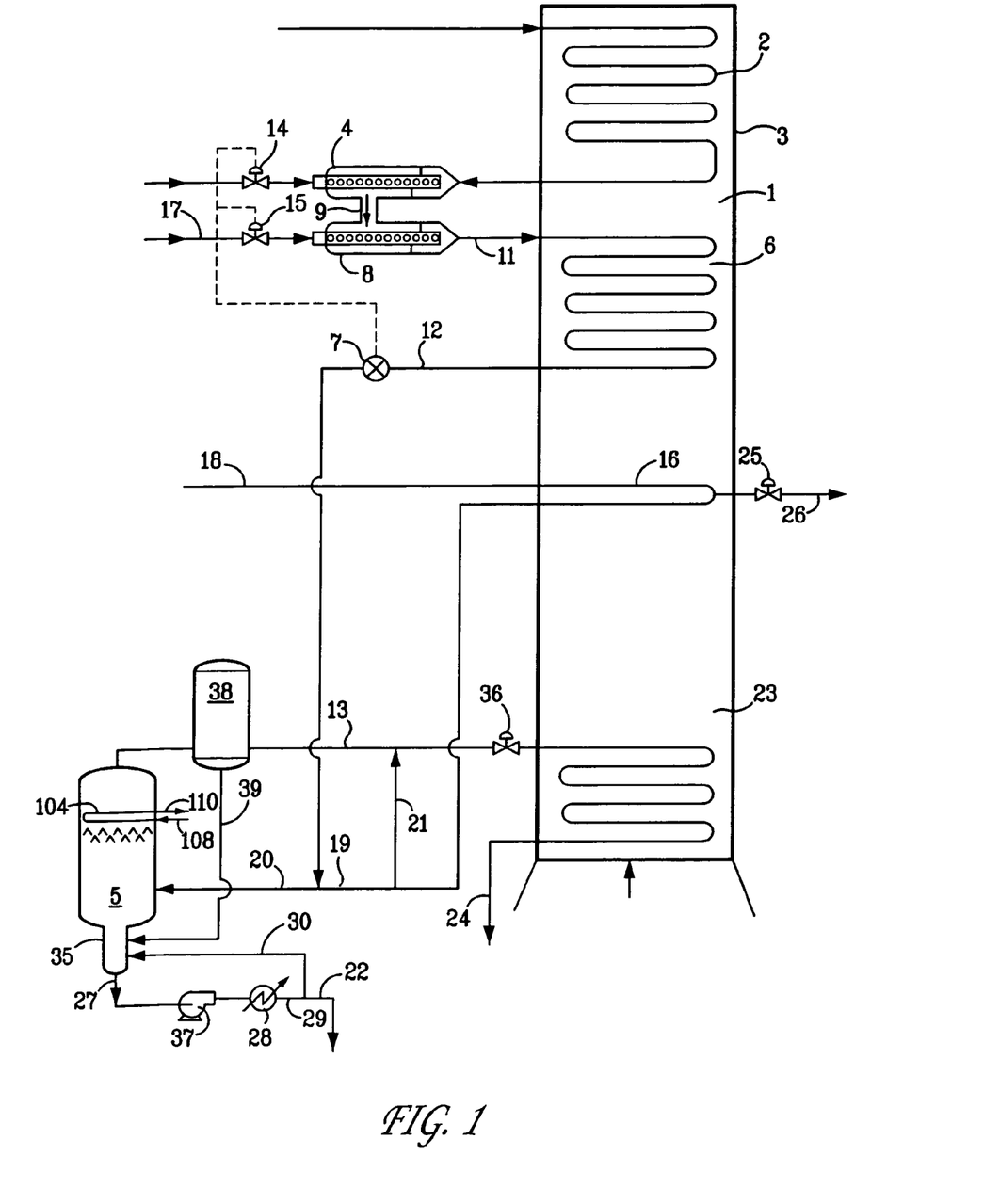
FIG. 1 illustrates a schematic flow diagram of a process in accordance with the present invention employed with a pyrolysis furnace.

The heating of the hydrocarbon feedstock containing resid can take any form known by those of ordinary skill in the art. However, as seen in FIG. 1, it is preferred that the heating comprises indirect contact of the hydrocarbon feedstock 40 in the upper (farthest from the radiant section) convection section tube bank 2 of the furnace 1 with hot flue gases from the radiant section of the furnace. This can be accomplished, by way of non-limiting example, by passing the hydrocarbon feedstock through a bank of heat exchange tubes 2 located within the convection section 3 of the furnace 1. The heated hydrocarbon feedstock typically has a temperature between about 150 and about 260° C. (300 to 500° F.), such as between about 160 to about 230° C. (325 to 450° F.), for example, between about 170 to about 220° C. (340 to 425° F.).

The heated hydrocarbon feedstock is mixed with primary dilution steam and optionally, a fluid that can be a hydrocarbon (preferably liquid but optionally vapor), water, steam, or a mixture thereof. The preferred fluid is water. A source of the fluid can be low-pressure boiler feed water. The temperature of the fluid can be below, equal to, or above the temperature of the heated feedstock.

The mixing of the heated hydrocarbon feedstock and the fluid can occur inside or outside the pyrolysis furnace 1, but preferably it occurs outside the furnace. The mixing can be accomplished using any mixing device known within the art. For example, it is possible to use a first sparger 4 of a double sparger assembly 9 for the mixing. The first sparger 4 can avoid or reduce hammering, caused by sudden vaporization of the fluid, upon introduction of the fluid into the heated hydrocarbon feedstock.

The present invention typically uses steam streams in various parts of the process. The primary dilution steam stream 17 can be mixed with the heated hydrocarbon feedstock as detailed below. In another embodiment, a secondary dilution steam stream 18 can be heated in the convection section and mixed with the heated mixture steam before the flash. The source of the secondary dilution steam may be primary dilution steam that has been superheated, optionally, in a convection section of the pyrolysis furnace. Either or both of the primary and secondary dilution steam streams may comprise sour or process steam. Superheating the sour or process dilution steam minimizes the risk of corrosion, which could result from condensation of sour or process steam.

In one embodiment of the present invention, in addition to the fluid mixed with the heated feedstock, the primary dilution steam 17 is also mixed with the feedstock. The primary dilution steam stream can be preferably injected into a second sparger 8. It is preferred that the primary dilution steam stream is injected into the hydrocarbon fluid mixture before the resulting stream mixture optionally enters the convection section at 11 for additional heating by flue gas, generally within the same tube bank as would have been used for heating the hydrocarbon feedstock.

The primary dilution steam can have a temperature greater, lower or about the same as hydrocarbon feedstock fluid mixture but preferably the temperature is greater than that of the mixture and serves to partially vaporize the feedstock/fluid mixture. The primary dilution steam may be superheated before being injected into the second sparger 8.

The mixture stream comprising the heated hydrocarbon feedstock, the fluid, and the primary dilution steam stream leaving the second sparger 8 is optionally heated again in the convection section of the pyrolysis furnace 3 before the flash. The heating can be accomplished, by way of non-limiting example, bypassing the mixture stream through a bank of heat exchange tubes 6 located within the convection section, usually as part of the first convection section tube bank, of the furnace and thus heated by the hot flue gas from the radiant section of the furnace. The thus-heated mixture stream leaves the convection section as a mixture stream 12 to optionally be further mixed with an additional steam stream.

Optionally, the secondary dilution steam stream 18 can be further split into a flash steam stream 19 which is mixed with the hydrocarbon mixture 12 before the flash and a bypass steam stream 21 which bypasses the flash of the hydrocarbon mixture and, instead is mixed with the vapor phase from the flash before the vapor phase is cracked in the radiant section of the furnace. The present invention can operate with all secondary dilution steam 18 used as flash steam 19 with no bypass steam 21. Alternatively, the present invention can be operated with secondary dilution steam 18 directed to bypass steam 21 with no flash steam 19. In a preferred embodiment in accordance with the present invention, the ratio of the flash steam stream 19 to bypass steam stream 21 should be preferably 1:20 to 20:1, and most preferably 1:2 to 2:1. In this embodiment, the flash steam 19 is mixed with the hydrocarbon mixture stream 12 to form a flash stream 20, which typically is introduced before the flash in flash/separation vessel 5. Preferably, the secondary dilution steam stream is superheated in a superheater section 16 in the furnace convection before splitting and mixing with the hydrocarbon mixture. The addition of the flash steam stream 19 to the hydrocarbon mixture stream 12 aids the vaporization of most volatile components of the mixture before the flash stream 20 enters the flash/separator vessel 5.

The mixture stream 12 or the flash stream 20 is then introduced for flashing, either directly or through a tangential inlet (to impart swirl) to a flash/separation apparatus, e.g., flash/separator vessel 5, for separation into two phases: a vapor phase comprising predominantly volatile hydrocarbons and steam and a liquid phase comprising predominantly non-volatile hydrocarbons. The vapor phase is preferably removed from the flash/separator vessel as an overhead vapor stream 13. The vapor phase, preferably, is fed back to a convection section tube bank 23 of the furnace, preferably located nearest the radiant section of the furnace, for optional heating and through crossover pipes 24 to the radiant section of the pyrolysis furnace for cracking. The liquid phase of the flashed mixture stream is removed from the flash/separator vessel 5 as a bottoms stream 27.

It is preferred to maintain a predetermined constant ratio of vapor to liquid in the flash/separator vessel 5, but such ratio is difficult to measure and control. As an alternative, temperature of the mixture stream 12 before the flash/separator vessel 5 can be used as an indirect parameter to measure, control, and maintain an approximately constant vapor to liquid ratio in the flash/separator vessel 5. Ideally, when the mixture stream temperature is higher, more hydrocarbons will be vaporized and become available, as a vapor phase, for cracking. However, when the mixture stream temperature is too high, more heavy hydrocarbons will be present in the vapor phase and carried over to the convection furnace tubes, eventually coking the tubes. If the mixture stream 12 temperature is too low, resulting in a low ratio of vapor to liquid in the flash/separator vessel 5, more volatile hydrocarbons will remain in liquid phase and thus will not be available for cracking.

The mixture stream temperature is limited by highest recovery/vaporization of volatiles in the feedstock while avoiding excessive coking in the furnace tubes or coking in piping and vessels conveying the mixture from the flash/separator vessel to the furnace 1 via line 13. The pressure drop across the vessels and piping 13 conveying the mixture to the lower convection section 23, and the crossover piping 24, and the temperature rise across the lower convection section 23 may be monitored to detect the onset of coking problems. For instance, when the crossover pressure and process inlet pressure to the lower convection section 23 begins to increase rapidly due to coking, the temperature in the flash/separator vessel 5 and the mixture stream 12 should be reduced. If coking occurs in the lower convection section, the temperature of the flue gas to the superheater 16 increases, requiring more desuperheater water 26 via valve 25.

The selection of the mixture stream 12 temperature is also determined by the composition of the feedstock materials. When the feedstock contains higher amounts of lighter hydrocarbons, the temperature of the mixture stream 12 can be set lower. As a result, the amount of fluid used in the first sparger 4 would be increased and/or the amount of primary dilution steam used in the second sparger 8 would be decreased since these amounts directly impact the temperature of the mixture stream 12. When the feedstock contains a higher amount of non-volatile hydrocarbons, the temperature of the mixture stream 12 should be set higher. As a result, the amount of fluid used in the first sparger 4 would be decreased while the amount of primary dilution steam used in the second sparger 8 would be increased. By carefully selecting a mixture stream temperature, the present invention can find applications in a wide variety of feedstock materials.

Typically, the temperature of the mixture stream 12 can be set and controlled at between about 315 and about 540° C. (600 and 1000° F.), such as between about 370 and about 510° C. (700 and 950° F.), for example, between about 400 and about 480° C. (750 and 900° F.), and often between about 430 and about 475° C. (810 and 890° F.). These values will change with the concentration of volatiles in the feedstock as discussed above.

Considerations in determining the temperature include the desire to maintain a liquid phase to reduce the likelihood of coke formation on exchanger tube walls and in the flash/separator.

The temperature of mixture stream 12 can be controlled by a control system 7 which comprises at least a temperature sensor and any known control device, such as a computer application. Preferably, the temperature sensors are thermocouples. The control system 7 communicates with the fluid valve 14 and the primary dilution steam valve 15 so that the amount of the fluid and the primary dilution steam entering the two spargers can be controlled.

In order to maintain a constant temperature for the mixture stream 12 mixing with flash steam 19 and entering the flash/separator vessel to achieve a constant ratio of vapor to liquid in the flash/separator vessel 5, and to avoid substantial temperature and flash vapor to liquid ratio variations, the present invention operates as follows: When a temperature for the mixture stream 12 before the flash/separator vessel 5 is set, the control system 7 automatically controls the fluid valve 14 and primary dilution steam valve 15 on the two spargers. When the control system 7 detects a drop of temperature of the mixture stream, it will cause the fluid valve 14 to reduce the injection of the fluid into the first sparger 4. If the temperature of the mixture stream starts to rise, the fluid valve will be opened wider to increase the injection of the fluid into the first sparger 4. In one possible embodiment, the fluid latent heat of vaporization controls mixture stream temperature.

When the primary dilution steam stream 17 is injected to the second sparger 8, the temperature control system 7 can also be used to control the primary dilution steam valve 15 to adjust the amount of primary dilution steam stream injected to the second sparger 8. This further reduces the sharp variation of temperature changes in the flash 5. When the control system 7 detects a drop of temperature of the mixture stream 12, it will instruct the primary dilution steam valve 15 to increase the injection of the primary dilution steam stream into the second sparger 8 while valve 14 is closed more. If the temperature starts to rise, the primary dilution steam valve will automatically close more to reduce the primary dilution steam stream injected into the second sparger 8 while valve 14 is opened wider.

In one embodiment in accordance with the present invention, the control system 7 can be used to control both the amount of the fluid and the amount of the primary dilution steam stream to be injected into both spargers.

In an example embodiment where the fluid is water, the controller varies the amount of water and primary dilution steam to maintain a constant mixture stream temperature 12, while maintaining a constant ratio of $H_2O$-to-feedstock in the mixture 11. To further avoid sharp variation of the flash temperature, the present invention also preferably utilizes an intermediate desuperheater providing desuperheater water 26 via valve 25 to the superheating section 16 of the secondary dilution steam in the furnace. This allows the superheater outlet temperature to be controlled at a constant value, independent of furnace load changes, coking extent changes, excess oxygen level changes, and other variables. Normally, this desuperheater maintains the temperature of the secondary dilution steam between about 425 and about 590° C. (800 and 1100° F.), for example, between about 455 and about 540° C. (850 and 1000° F.), such as between about 455 and about 510° C. (850 and 950° F.), and typically between about 470 and about 495° C. (875 and 925° F.). The desuperheater comprises the control valve 25 and an optional water atomizer nozzle. After partial preheating, the secondary dilution steam exits the convection section and a fine mist of water can be added which rapidly vaporizes and reduces the temperature. The steam is preferably then further heated in the convection section. The amount of water added to the superheater can control the temperature of the steam mixed with mixture stream 12.

Although the description above is based on adjusting the amounts of the fluid and the primary dilution steam streams injected into the hydrocarbon feedstock in the two spargers 4 and 8, according to the predetermined temperature of the mixture stream 12 before the flash/separator vessel 5, the same control mechanisms can be applied to other parameters at other locations. For instance, the flash pressure and the temperature and the flow rate of the flash steam 19 can be changed to effect a change in the vapor to liquid ratio in the flash. Also, excess oxygen in the flue gas can also be a control variable, albeit possibly a slow one.

In addition to maintaining a constant temperature of the mixture stream 12 entering the flash/separator vessel, it is generally also desirable to maintain a constant hydrocarbon partial pressure of the flash stream 20 in order to maintain a constant ratio of vapor to liquid in the flash/separator vessel. By way of examples, the constant hydrocarbon partial pressure can be maintained by keeping constant flash/separator vessel pressure through the use of control valves 36 on the vapor phase line 13, and by controlling the ratio of steam to hydrocarbon feedstock in stream 20.

Typically, the hydrocarbon partial pressure of the flash stream in the present invention is set and controlled at between about 25 and about 175 kPa (4 and about 25 psia), such as between about 35 and about 100 kPa (5 and 15 psia), for example, between about 40 and about 75 kPa (6 and 11 psia).

In one embodiment, the flash is conducted in at least one flash/separator vessel. Typically the flash is a one-stage process with or without reflux. The flash/separator vessel 5 is normally operated at about 275 to 1400 kPa (40 to 200 psia) pressure and its temperature is usually the same or slightly lower than the temperature of the flash stream 20 at the flash/separation apparatus feed inlet before entering the flash/separator vessel 5. Typically, the pressure at which the flash/separator vessel operates is at about 275 to about 1400 kPa (40 to 200 psia) and the temperature is at about 310 to about 540° C. (600 to 1000° F.). For example, the pressure of the flash can be about 600 to about 1100 kPa (85 to 160 psia) and the temperature can be about 370 to about 490° C. (700 to 920° F.). As a further example, the pressure of the flash can be about 700 to about 1000 kPa (100 to 145 psia) with a temperature of about 400 to about 480° C. (750 to 900° F.). In yet another example, the pressure of the flash/separator vessel can be about 700 to about 860 kPa (100 to 125 psia) and the temperature can be about 430 to about 475° C. (810 to 890° F.). Depending on the temperature of the mixture stream 12, generally about 50 to about 98% of the mixture stream being flashed is in the vapor phase, such as about 60 to about 95%, for example, about 65 to about 90%.

The flash/separator vessel 5 is generally operated, in one aspect, to minimize the temperature of the liquid phase at the bottom of the vessel because too much heat may cause coking of the non-volatiles in the liquid phase. Use of the secondary dilution steam stream 18 in the flash stream entering the flash/separator vessel lowers the vaporization temperature because it reduces the partial pressure of the hydrocarbons (i.e., a larger mole fraction of the vapor is steam) and thus lowers the required liquid phase temperature. It may also be helpful to recycle a portion of the externally cooled flash/separator vessel bottoms liquid 30 back to the flash/separator vessel to help cool the newly separated liquid phase at the bottom of the flash/separator vessel 5. Stream 27 can be conveyed from the bottom of the flash/separator vessel 5 to the cooler 28 via pump 37. The cooled stream 29 can then be split into a recycle stream 30 and export stream 22. The temperature of the recycled stream would typically be about 260 to about 315° C. (500 to 600° F.), for example, about 270 to about 290° C. (520 to 550° F.). The amount of recycled stream can be from about 80 to about 250% of the amount of the newly separated bottom liquid inside the flash/separator vessel, such as from about 90 to about 225%, for example, from about 100 to about 200%.

The flash is generally also operated, in another aspect, to minimize the liquid retention/holding time in the flash vessel. In one example embodiment, the liquid phase is discharged from the vessel through a small diameter "boot" or cylinder 35 on the bottom of the flash/separator vessel. Typically, the liquid phase retention time in the drum is less than about 75 seconds, for example, less than about 60 seconds, such as less than about 30 seconds, and often less than about 15 seconds. The shorter the liquid phase retention/holding time in the flash/separator vessel, the less coking occurs in the bottom of the flash/separator vessel.

When the mixture of steam and water mixed with hydrocarbon enters the flash/separator vessel 5, a perfect or near perfect vapor/liquid separation occurs, with the vapor being at its dew point. Since the flash drum has no theoretical stages of separation, even if the vapor/liquid separation is perfect, thermodynamic calculations predict about 10 ppm of the hydrocarbon vapor has a normal boiling point above 760° C. (1400° F.). The vapor spends about 30 seconds in the flash drum at 450° C. (850° F.) causing cracking and coking of some of the heavier molecules. Because cracking and coking are endothermic reactions, the vapor will cool below its dew point, causing a fraction of the heavier molecules to condense. Coking of the condensed molecules produces even heavier molecules and the condensed and coked molecules foul the piping downstream from the overheads outlet of the flash drum, e.g., the piping downstream of centrifugal separator 38 and crossover piping 24. Accordingly, the present invention treats the vapor phase by contacting it with condenser 104 to effect partial condensation of the vapor phase.

Figure 2:
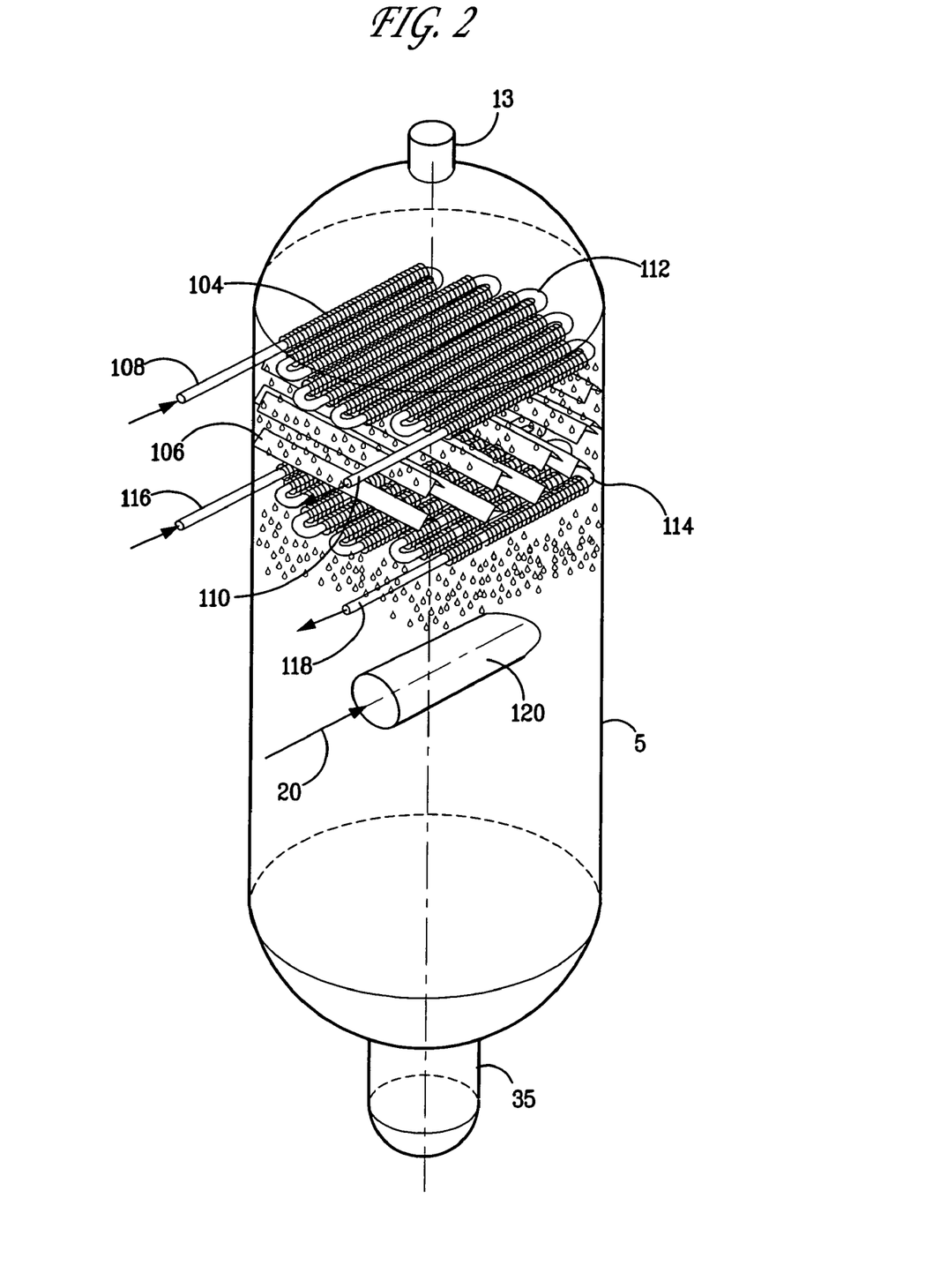
FIG. 2 illustrates a flash/separation apparatus of the present invention comprising dual finned serpentine cooling coils with interposed sheds.

In one embodiment, as depicted in FIG. 2, the feed mixture containing hydrocarbon and steam is introduced through a tangential inlet 120 via line 20. The condenser 104 comprises a first serpentine, finned cooling coil 112 inside the top of the flash/separator vessel 5 which coil has a cooling medium inlet 108, and a cooling medium outlet 110. The fins effect good drop distribution across the flash/separator vessel cross-section area as compared to bare tubes. Droplets forming on the coil and fins can flow down the fin surface, improving vapor/liquid heat and mass transfer. Sheds 106 are installed below the first coil. A second serpentine finned cooling coil 114 having a cooling medium inlet 116 and a cooling medium outlet 118 is installed beneath the sheds. Hydrocarbon liquid drops fall off the sheds into the boot 35 preventing coke buildup.

Figures 3, 4:
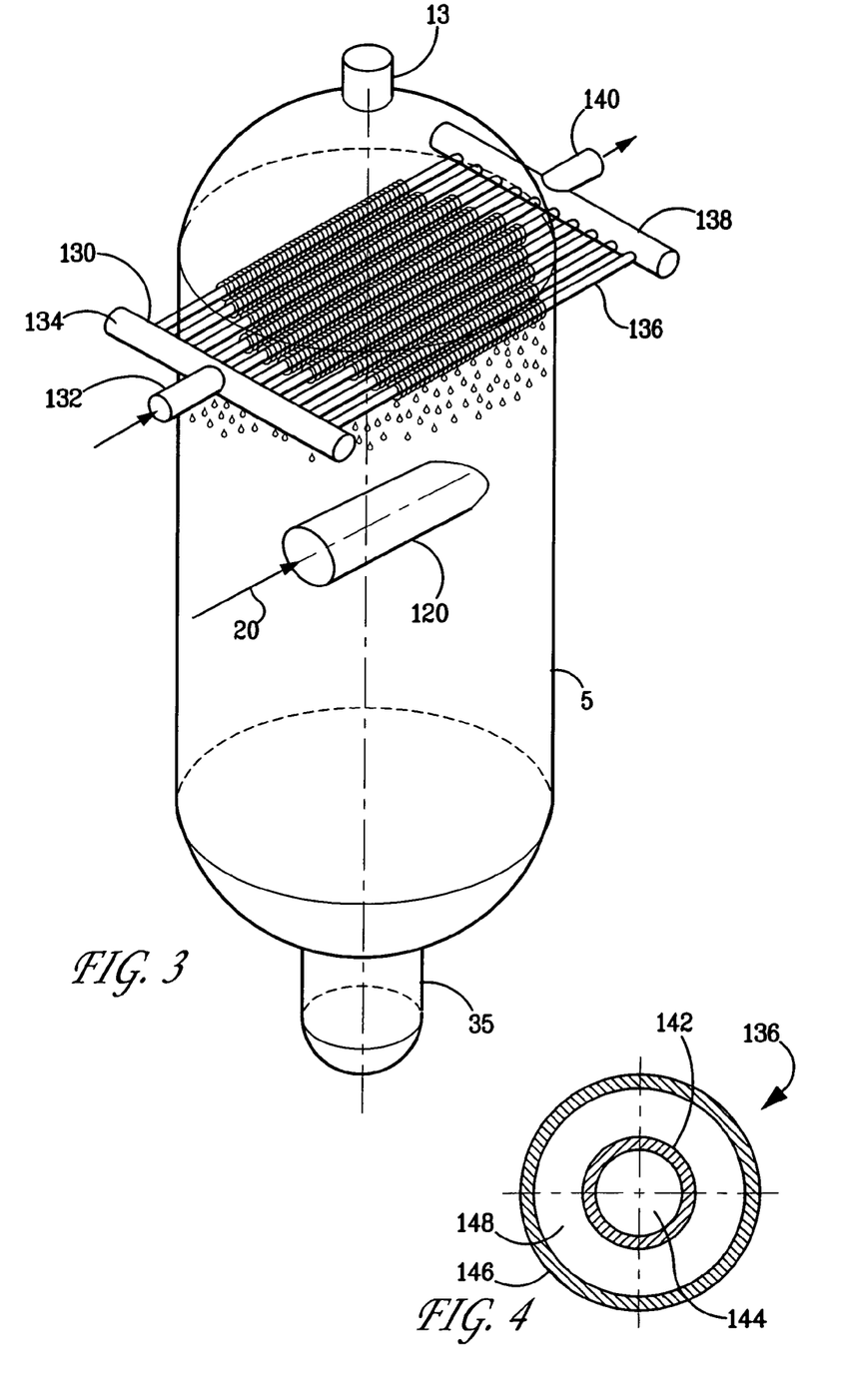
FIG. 3 illustrates a flash/separation apparatus of the present invention showing a single parallel finned cooling coil with concentric pipe coolers.
FIG. 4 illustrates a cross-section of concentric pipe coolers used in the present invention.

In another embodiment, as depicted in FIG. 3, the feed mixture containing hydrocarbon and steam is introduced through a tangential inlet 120 via line 20. The condenser 130 can comprise a substantially straight inlet 132 communicating with an inlet manifold 134 and parallel cooling tubes 136 substantially perpendicular to and communicating with inlet manifold 134 and substantially perpendicular to and communicating with an outlet manifold 138, with a substantially straight outlet 140 perpendicular to and communicating with the outlet manifold.

In one embodiment, the cooling tubes 136 comprise concentric pipes as depicted in FIG. 4, with an internal pipe 142 through which water 144 is passed and a concentric external pipe 146 through which steam 148 is passed. This arrangement permits a reduced water rate. Water flows through the inner pipe while low pressure steam flows through the annulus. Because low pressure steam has a relatively low thermal conductivity, the tube metal temperature of the outside pipe can be from about 260 to about 315° C. (500-600° F.) even though the water is much colder. This colder water can absorb more heat per kg (pound) without localized boiling occurring in the film at the tube wall effecting a lower water rate for a given quantity of heat transfer. Boiling in the film may cause excessive pressure drop in this water coil. Another way to attain such tube metal temperature is to cool with high pressure/moderate temperature boiler feed water. In one embodiment, 0.2 MW (0.7 MBtu/hr) of heat can be removed via a single serpentine coil (as shown in FIG. 2) in a 4 m (13.5 ft) diameter flash/separation drum, where the coils are 10 cm (4 in) Nominal Pipe Size (NPS) with 2 cm (0.75 in) height fins at 0.8 fins/cm (2 fins/in). The embodiment uses 4500 kg/hr (10000 lbs/hr) of 10500 kPa (1500 psig) boiler feed water heated from about 150 to about 180° C. (300-360° F.) with a maximum film temperature, i.e., the maximum temperature of the water in contact with the pipe walls (with no localized boiling and flow cycling) of about 240° C. (460° F.). Maximum tube metal temperature (TMT) is about 255° C. (490° F.) while maximum fin tip temperature is about 350° C. (660° F.).

The vapor phase taken as overhead from the flash/separation apparatus 5 via 13 may contain, for example, 55 to 70% hydrocarbons and 30 to 45% steam. The boiling end point of the vapor phase is normally below about 760° C. (1400° F.), such as below about 1100° F. (590° C.). The vapor phase is continuously removed from the flash/separator vessel 5 through an overhead pipe, which optionally conveys the vapor to a centrifugal separator 38 to remove trace amounts of entrained and/or condensed liquid which can be recycled to boot 35 as quench via line 39. Optionally, steam cracker gas oil (about 205 to about 290° C. (400 to 560° F.) boiling range) or other low viscosity hydrocarbon having a similar boiling range can be added to line 39 as quench or fluxant. The vapor from line 13 then typically flows into a manifold that distributes the flow to the convection section of the furnace.

The vapor phase stream 13 continuously removed from the flash/separator vessel is preferably superheated in the pyrolysis furnace lower convection section 23 to a temperature of, for example, about 425 to about 705° C. (800 to about 1300° F.) by the flue gas from the radiant section of the furnace. The vapor phase is then introduced to the radiant section of the pyrolysis furnace to be cracked.

The vapor phase stream 13 removed from the flash/separator vessel can optionally be mixed with a bypass steam stream 21 before being introduced into the furnace lower convection section 23.

The bypass steam stream 21 is a split steam stream from the secondary dilution steam 18. Preferably, the secondary dilution steam is first heated in the convection section of the pyrolysis furnace 3 before splitting and mixing with the vapor phase stream removed from the flash 5. In some applications, it may be possible to superheat the bypass steam again after the splitting from the secondary dilution steam but before mixing with the vapor phase. The superheating after the mixing of the bypass steam 21 with the vapor phase stream 13 ensures that all but the heaviest components of the mixture in this section of the furnace are vaporized before entering the radiant section. Raising the temperature of vapor phase from about 425 to about 705° C. (800 to 1300° F.) in the lower convection section 23 also helps the operation in the radiant section since radiant tube metal temperature can be reduced. This results in less coking potential in the radiant section. The superheated vapor is then cracked in the radiant section of the pyrolysis furnace.

Because the controlled flash of the mixture stream results in significant removal of the coke- and tar-producing heavier hydrocarbon species (in the liquid phase), it is possible to utilize a transfer line exchanger for quenching the effluent from the radiant section of the pyrolysis furnace. Among other benefits, this will allow more cost-effective retrofitting of cracking facilities initially designed for lighter feeds, such as naphthas, or other liquid feedstocks with end boiling points generally below about 315° C. (600° F.), which have transfer line exchanger quench systems already in place.

After being cooled in the transfer line exchanger, the furnace effluent may optionally be further cooled by injection of a stream of suitable quality quench oil.

The present invention's use of an internal partial condenser within the flash/separation apparatus provides several benefits. The condenser cleans up during each steam/air decoke of the drum, eliminating costly maintenance and shutdowns.

The condenser's minimal space requirements permit retrofitting of current flash/separation apparatus. Where fouling is caused by entrainment of resid rather than strictly vapor/liquid equilibrium, the raining droplets produced by the condenser will also remove liquid resid in the vapor. Where a 50% reduction is achieved in the 760° C. (1400° F.) or above fraction present in the vapor exiting the flash/separation apparatus, overhead fouling is reduced or a greater hydrocarbon vapor cut can be taken.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A flash/separation vessel for treating hydrocarbon feedstock containing resid to provide a liquid phase and a vapor phase, which comprises:
   (a) an inlet for introducing to said vessel under flashing conditions a mixture stream comprising said hydrocarbon feedstock and steam where the mixture stream undergoes an initial flashing to form i) a vapor phase at its dew point which contains a lesser portion of coke precursors; and ii) a liquid phase which contains a greater portion of coke precursors;
   (b) a partial condenser located above said inlet and comprising a heat-conducting tube with fins along its length and containing a cooling medium, for contacting the vapor phase within said flash/separation vessel and at least partially condensing at least some of said lesser portion of coke precursors, which adds to said liquid phase, said condensing providing a vapor phase of reduced coke precursor content;
   (c) a flash/separation vessel overhead outlet for removing the vapor phase of reduced coke precursors content as overhead; and
   (d) a flash/separation vessel liquid outlet for removing said liquid phase as bottoms from said flash/separation vessel.

2. The vessel of claim 1 wherein said tube is metal.

3. The vessel of claim 2 wherein said cooling medium comprises liquid.

4. The vessel of claim 3 wherein said cooling medium comprises water.

5. The vessel of claim 4 wherein said cooling medium is boiler feed water.

6. The vessel of claim 3 wherein said condenser is substantially planar and horizontally mounted.

7. The vessel of claim 6 wherein said tube is continuous and comprised of alternating straight sections and 180° bend sections beginning with a straight inlet section and terminating in a straight outlet section.

8. The vessel of claim 6 wherein said condenser comprises a substantially straight inlet communicating with an inlet manifold substantially perpendicular to said straight inlet, at least two substantially parallel cooling tubes substantially perpendicular to and communicating with said inlet manifold and substantially perpendicular to and communicating with an outlet manifold, and a substantially straight outlet perpendicular to and communicating with said outlet manifold.

9. The vessel of claim 1 wherein said tube has a diameter of about 2.5 to about 10 cm (1 to 4 in).

10. The vessel of claim 1 wherein said condenser heat duty ranges from at least one of i) about 0.06 to about 0.60 MW (0.2 to 2 MBtu/hr) and ii) about 0.06 to about 0.6% of furnace firing.

11. The vessel of claim 10 wherein said condenser heat duty ranges from at least one of i) about 0.1 to about 0.3 MW (0.4 to 1 MBtu/hr) and ii) about 0.1 to about 0.3% of furnace firing.

12. The vessel of claim 1 wherein said tube comprises at least about 2 fin/cm of tube length (5 fins/inch of tube length).

13. The vessel of claim 12 wherein said fins range from about 5/8 to about 2½ cm (¼ to 1 in) in height, and about 0.05 to about 0.4 cm (0.02 to 0.15 in) in thickness.

14. The vessel of claim 13 wherein said fins are of about 2 cm (¾ in) in height, and about ⅛ cm (0.05 in) in thickness.

15. The vessel of claim 1 wherein said tube comprises a tube inlet and a tube outlet.

16. A flash/separation vessel for treating hydrocarbon feedstock containing resid to provide a liquid phase and a vapor phase, which comprises:
   (a) an inlet for introducing to said vessel under flashing conditions a mixture stream comprising said hydrocarbon feedstock and steam where the mixture stream undergoes an initial flashing to form i) a vapor phase at its dew point which contains a lesser portion of coke precursors; and ii) a liquid phase which contains a greater portion of coke precursors;
   (b) a partial condenser located above said inlet and comprising a heat-conducting tube containing a cooling medium, wherein said tube comprises a substantially concentrically placed inner tube within an outer tube wherein water is passed through said inner tube and steam is passed through said outer tube, for contacting the vapor phase within said flash/separation vessel and at least partially condensing at least some of said lesser portion of coke precursors, which adds to said liquid phase, said condensing providing a vapor phase of reduced coke precursor content;
   (c) a flash/separation vessel overhead outlet for removing the vapor phase of reduced coke precursors content as overhead; and
   (d) a flash/separation vessel liquid outlet for removing said liquid phase as bottoms from said flash/separation vessel.

17. The vessel of claim 16 wherein said inner tube has a diameter ranging from about 2½ to about 10 cm (1 to 4 in) and said outer tube has a diameter ranging from about 5 to about 15 cm (2 to 6 in).

18. The vessel of claim 17 wherein said inner tube has a diameter of about 5 cm (2 in) and said outer tube has a diameter of about 10 cm (4 in).

19. A flash/separation vessel for treating hydrocarbon feedstock containing resid to provide a liquid phase and a vapor phase, which comprises:
   (a) an inlet for introducing to said vessel under flashing conditions a mixture stream comprising said hydrocarbon feedstock and steam where the mixture stream undergoes an initial flashing to form i) a vapor phase at its dew point which contains a lesser portion of coke precursors; and ii) a liquid phase which contains a greater portion of coke precursors;
   (b) a partial condenser located above said inlet and comprising a heat-conducting tube containing a cooling medium, for contacting the vapor phase within said flash/separation vessel and at least partially condensing at least some of said lesser portion of coke precursors, which adds to said liquid phase, said condensing providing a vapor phase of reduced coke precursor content;
(c) a first row of sheds arranged substantially perpendicular to said tube and positioned beneath said condenser to improve contact between condensate and rising vapor;
(d) a flash/separation vessel overhead outlet for removing the vapor phase of reduced coke precursors content as overhead; and
(e) a flash/separation vessel liquid outlet for removing said liquid phase as bottoms from said flash/separation vessel.

20. The vessel of claim 19 further comprising at least one additional row of sheds substantially parallel to and beneath said first row of sheds.

21. A flash/separation vessel for treating hydrocarbon feedstock containing resid to provide a liquid phase and a vapor phase, which comprises:
(a) an inlet for introducing to said vessel under flashing conditions a mixture stream comprising said hydrocarbon feedstock and steam where the mixture stream undergoes an initial flashing to form i) a vapor phase at its dew point which contains a lesser portion of coke precursors; and ii) a liquid phase which contains a greater portion of coke precursors;
(b) a partial condenser located above said inlet and comprising a heat-conducting tube containing a cooling medium, for contacting the vapor phase within said flash/separation vessel and at least partially condensing at least some of said lesser portion of coke precursors, which adds to said liquid phase, said condensing providing a vapor phase of reduced coke precursor content;
(c) a set of passive liquid/vapor contacting surfaces positioned beneath said condenser to improve contact between condensate and rising vapor;
(d) a second condenser located beneath said liquid/vapor contacting surfaces;
(e) a flash/separation vessel overhead outlet for removing the vapor phase of reduced coke precursors content as overhead; and
(f) a flash/separation vessel liquid outlet for removing said liquid phase as bottoms from said flash/separation vessel.

* * * * *